United States Patent Office 3,238,144
Patented Mar. 1, 1966

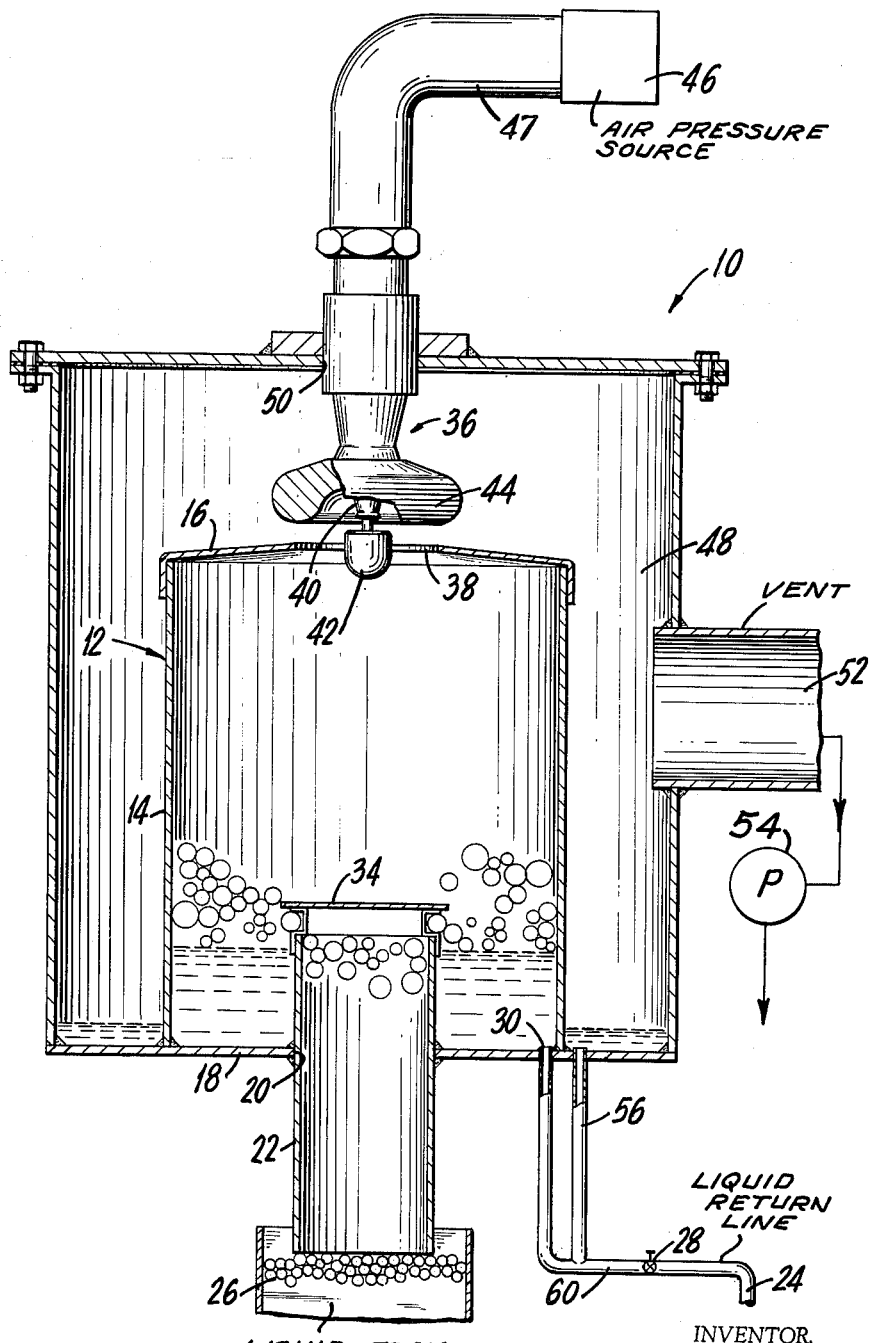

3,238,144
SONIC FOAM SUPPRESSOR
William K. Fortman, Syosset, N.Y., assignor to
Astrosonics, Inc., Syosset, N.Y.
Filed July 27, 1962, Ser. No. 212,869
2 Claims. (Cl. 252—361)

The present invention relates to a sonic foam suppressor for use with pipe lines carrying liquid having a high foam content, such as milk, beer, or the like. It is intended as an in-line installation in the continuous processing of such liquids in bottling or canning plants, where elimination of foam is necessary before sealing the liquid in a container.

In large scale, continuous processing of liquids having a high foam content, it is especially desirable to have simplified, compact equipment, since maintenance must be kept to a minimum and shutdowns can involve costly, liquid storage problems. It is also desirable that the maximum amount of foam recovery take place, so that the foam can be reconverted to the liquid form and returned to the processing system. For this reason, a compact, in-line installation is necessary since in many cases, close temperature limits are maintained, and the reformed liquid must be at the same temperature as the original liquid. It should also be noted that in the handling of food liquids, such as beer or milk, high standards of sterilization of equipment must be maintained. Therefore, equipment with a minimum of moving parts is especially valuable in this field. The device of the present invention employs no moving parts in the foam-breaking chamber, and is especially adapted for use where maximum cleanliness of equipment is necessary.

In the aforementioned canning and bottling processes there has long been a problem of eliminating the foam formed in said processes. The foam formed while filling, for example, bottles with milk makes it difficult to properly cap and fill said bottles. An attendant and costly disadvantage is the loss of the foam that overflows the bottles while filling them. It is the purpose of this invention to obviate the aforementioned difficulties inherent in said processes.

The apparatus of this invention may also be used for treatment of individual batches where foam elimination is required under other than continuous production conditions.

It is therefore a primary object of the present invention to provide a foam suppressor device of simplified construction having a very high degree of reliability for continuous operation over extended periods of time.

It is a further object of the present invention to provide a device for the elimination of foam characterized by the absence of moving parts whereby cleanliness of the unit may readily be maintained.

A further object is the provision of a compact device adapted to reform foam almost completely into the original liquid with minimum change in temperature and other parameters.

It is a further object of the present invention to provide novel vacuum means within the foam breaking chamber in order to draw foam into the chamber from the liquid being processed.

These and other objects and advantages of the present invention will be pointed out with further particularity, or will be apparent from the following description and the figure appended thereto, in which is shown a preferred embodiment of the present invention in vertical cross-section.

The preferred spray nozzle shown in the drawing is claimed in the copending application of Robert S. Soloff, entitled Torodial Acoustic Reflector filed July 9, 1962 and assigned S.N. 210,298, now U.S. Patent No. 3,107,647, issued October 22, 1963.

Referring now to the drawing, a device of the present invention characterized generally by the number 10 comprises foam breaker chamber 12 having side walls 14, top wall 16, and bottom wall 18. An opening 20 is formed on bottom wall 18, through which is passed foam passage 22, which extends partly into chamber 12, with opening 20 of wall 18 defining an inlet port. A portion of foam passage 22 extends externally of chamber 12 and is connected to the liquid-foam source 26. It will be understood that the present invention may be installed in vats or other applications where a batch process is employed. It may also be installed in slow moving liquid flow lines whereby the foam is siphoned off the top of the flowing liquid. However, in the present illustration, the apparatus of this invention is shown connected to a static foam source such as a milk container. The conduit 22 is shown inserted into the milk container in such a manner as to allow the foam to be drawn up through said conduit into chamber 14. Outlet 30 is formed on the bottom wall 18, connecting to liquid return line 24.

As shown in the drawing, sonic generator 36 is positioned close to and directly above opening 38 formed on top wall 16 of foam chamber 12. Sonic generator 36 comprises nozzle 40, cavity resonator 42 disposed in coaxial opposition thereto, and toroidal reflector 44 disposed circumferentially about the end portion of nozzle 40. Air under pressure, supplied by pressure source 46 through conduit 47 is emitted as a jet stream from the convergent-divergent orifice of nozzle 40, and generates a high intensity sonic energy field upon impinging upon the cavity resonator, which in the preferred embodiment of the present invention, is of the type described in Patent No. 2,519,619 issued to Yellott et al. The jet stream is converted to sonic waves of alternating compression and rarefaction, radiating outwardly from cavity resonator 42. Reflector 44 is of aerodynamic configuration and adapted to facilitate passage of a substantial portion of the air directed upwards and away from opening 38. The high velocity of air passing upwardly through opening 38 from inside of chamber 12 to chamber 48 creates a substantial vacuum within chamber 12, on the order of 15 inches W.G. This vacuum draws foam from liquid-foam source 26 through foam passage 22, by baffle 34, into chamber 12. Baffle 34 acts as a deflector which serves to prevent fine foam buildup and resultant system clogging. Simultaneously, the sonic energy field is reflected downwards into the chamber by reflector 44. It should be noted that the apparatus of this invention is designed so that the sonic generator 36 may be adjusted to allow various rates of exhaust through opening 38. As illustrated in the aforementioned Soloff Patent No. 3,107,647, resonator 42 is hollow and open topped. This construction serves to reverse and deflect the gas radially away from the resonator and the material being processed, thus creating, in this case, a vacuum in chamber 12. Only the waves of sonic energy are deflected downwardly through opening 38 and into chamber 12 by reflector 44.

The sonic waves, which may be from 5 kc. up into the ultrasonic range of say, 50 kc. break the foam bubbles into an aerosol which is liquified by the action of standing waves of sonic energy within the closed area of foam chamber 12, causing the aerosol to precipitate against the container wall or to coalesce into droplets falling to the bottom of the chamber. It should be noted that the reconstitution of the aerosol into liquid forms a seal at the bottom of chamber 12 which effectively preserves the condition of vacuum within the chamber, as drain outlet 30 is blocked by this liquid seal. The reformed liquid is drained off periodically, being reintroduced to the liquid supply via conduit 60 and nonreturn one way valve 28 to liquid return line 24. Employing the device of the present invention, a very high recovery rate is possible as only a small portion of the micromist leaves chamber 12 through opening 38. Furthermore, of the small portion of micromist that enters chamber 48 through opening 38 only a small portion escapes through vent 52. The remaining portion is reformed in chamber 48, as in chamber 12, and returns to the liquid return line 24 via conduit 56.

It should be noted that portion 34 of conduit 22 serving as a baffle, separates the foam entering the chamber from the reformed liquid deposited on the bottom portion of the chamber. Thus, continual foam suppression and recovery takes place within the chamber.

To permit the compressed air leaving opening 38 to expand to atmosphere, outer chamber 48 is disposed about and encloses foam breaker chamber 12. Expansion chamber 48 encloses opening 38 of chamber 12 and sonic generator assembly 36, with an access opening 50 being formed in the upper portion of the chamber 48 to permit passage of nozzle 40. Vent 52 is provided for chamber 48 to permit venting of the air present in the expansion area. Optionally, the outlet port may be connected to conventional pumping means 54, to create a condition of vacuum within chamber 48, hence reinforcing the vacuum in chamber 12 thereby increasing foam accumulation within chamber 12 from foam passage 22. However, in most applications, sufficient vacuum is created by the action of the sonic generator assembly as described hereinabove.

It will be appreciated that the device of the present invention combines vacuum-producing means and foam breaking means in a single unit characterized by simplicity of construction and absence of moving parts. The device is extremely compact and is adapted to reform the maximum amount of foam into the original liquid. It will also be noted that problems of maintenance and sterilization of the device have been reduced to a minimum.

Various changes and modifications may be made by those skilled in the art without, however, departing from the intended scope of the invention.

What is claimed is:
1. A sonic foam suppressor for use with a foam evacuator line, comprising:
   a foam breaker chamber having a side wall, a top wall and a bottom wall, and having a first opening formed in the bottom wall;
   a conduit passed through said first opening and extending partly into said chamber, said conduit being sealably retained by said bottom wall to define an inlet port, said conduit extending outwardly from said chamber and adapted to be connected to a flow passage containing liquid normally having a high foam content;
   an outlet drain formed on the bottom wall of said chamber between said conduit and the side wall of said chamber;
   a second opening formed in the upper wall of said chamber;
   a sonic generator disposed a relatively short distance from said second opening, said sonic generator including a nozzle opening downwardly towards said second opening, and adapted to emit a jet stream of air, and a cup shaped cavity resonator disposed in coaxial opposition to said nozzle and adapted to be resonated by said jet stream to thereby create a high intensity sonic energy field, said air from said nozzle being redirected by said cavity resonator upwards and away from said second opening with high velocity to thereby induce a condition of vacuum in said foam breaker chamber, said vacuum being adapted to draw foam from said flow passage through said conduit into said foam breaker chamber;
   said sonic generator being provided with a toroidal reflector adapted to reflect said sonic energy field downwards through said second opening, said toroidal reflector being adapted to facilitate passage of said high velocity air upwards away from said chamber, said sonic energy field being adapted to convert said foam into aerosols, said aerosols being normally coalesced and precipitated to droplets by standing sonic waves formed within said chamber, whereby said foam is reconstituted into a liquid, said reconstituted liquid being adapted to maintain a liquid seal within said chamber and to be drawn out by said outlet drain;
   an expansion chamber disposed about and enclosing at least the upper part of said foam breaker chamber including said second opening and also enclosing said sonic generator and said toroidal reflector, said expansion chamber being provided with an access port for introduction of said nozzle;
   said expansion chamber being provided with outlet means, whereby said high velocity air stream directed away from said opening may be vented externally of said expansion chamber.
2. A device as in claim 1 wherein said outlet means for said expansion chamber is provided with low pressure means to thereby reinforce the vacuum created in said foam breaker chamber.

References Cited by the Examiner

UNITED STATES PATENTS

| | | |
|---|---|---|
| 1,449,114 | 3/1923 | Hayduck. |
| 1,945,073 | 2/1934 | Graham. |
| 2,361,861 | 10/1944 | Masowich _____ 230—95 |
| 2,519,619 | 8/1950 | Yellott et al. _____ 73—69 X |
| 3,107,647 | 10/1963 | Soloff _____ 116—137 |

FOREIGN PATENTS

| | | |
|---|---|---|
| 541,150 | 7/1922 | France. |
| 651,356 | 3/1951 | Great Britain. |

OTHER REFERENCES

Chemical Engg. Article, Sept. 4, 1961, pages 84, 86.

NORMAN YUDKOFF, *Primary Examiner.*

GEORGE D. MITCHELL, *Examiner.*

J. SOFER, *Assistant Examiner.*